United States Patent [19]

Smith

[11] Patent Number: 4,613,374

[45] Date of Patent: Sep. 23, 1986

[54] POZZOLANICALLY STABILIZED COMPOSITIONS HAVING IMPROVED PERMEABILITY COEFFICIENTS

[75] Inventor: Charles L. Smith, Conshohocken, Pa.

[73] Assignee: Conversion Systems, Inc., Horsham, Pa.

[21] Appl. No.: 703,725

[22] Filed: Feb. 21, 1985

[51] Int. Cl.$^4$ .............................................. C04B 7/34
[52] U.S. Cl. .................................. 106/118; 106/121; 106/DIG. 1
[58] Field of Search ................. 106/118, DIG. 1, 120, 106/121, 105

[56] References Cited

U.S. PATENT DOCUMENTS

| | | | |
|---|---|---|---|
| 3,076,717 | 7/1959 | Minnick | 106/118 |
| 3,230,103 | 1/1966 | Minnick | 106/118 |
| 3,720,609 | 3/1973 | Smith et al. | 106/109 X |
| 3,785,840 | 1/1974 | Minnick et al. | 106/118 |
| 4,018,619 | 4/1977 | Webster et al. | 106/DIG. 1 X |
| 4,038,095 | 7/1977 | Nicholson | 106/DIG. 1 X |
| 4,354,876 | 10/1982 | Webster | 106/118 X |
| 4,377,414 | 3/1983 | Buschmann et al. | 106/118 X |

*Primary Examiner*—William R. Dixon, Jr.
*Assistant Examiner*—Karl Group
*Attorney, Agent, or Firm*—Lerner, David, Littenberg, Krumholz & Mentlik

[57] ABSTRACT

Processes for the production of a hardenable mass having low permeability characteristics are disclosed, as well as the compositions produced thereby. The process includes providing a slurry produced from the scrubbing of sulfur oxide-containing gases with alkaline earth metal compounds, the slurry comprising an aqueous suspension of alkaline earth metal sulfites, mixing the slurry with a pozzolanically active waste material such as fly ash and an alkaline earth metal in the form of an alkaline earth metal hydroxide or a hydratable alkaline earth metal oxide in amounts so as to provide an overall composition including greater than about 3.5 weight percent alkaline earth metal oxide or hydroxide, that amount being based on an equivalent amount of alkaline earth metal oxide, on a dry weight and additive basis, and continuing the mixing of the overall composition for a period of time sufficient to provide a degree of mixing at least equivalent to about thirty seconds in a Hobart planetary mixer, at first speed, whereby the overall composition is mixed to a degree at least approaching the thixotropic state therefore. The compositions produced by this process have improved compressive strengths and significantly reduced permeability coefficients of less than about $1.0 \times 10^{-7}$ cm/sec.

21 Claims, No Drawings

POZZOLANICALLY STABILIZED COMPOSITIONS HAVING IMPROVED PERMEABILITY COEFFICIENTS

FIELD OF THE INVENTION

The present invention relates to novel hardenable masses. More particularly, the present invention relates to such hardenable masses which comprise cementitious compositions, and which include various waste products from combustion equipment, such as coal burning power generating stations. More particularly, the present invention relates to processes for producing hardenable masses. Still more particularly, the present invention relates to improved methods for producing such hardenable masses having highly superior permeability coefficients and strength.

BACKGROUND OF THE INVENTION

In the past few years there have been significant developments in the use and disposal of waste products from combustion equipment such as pulverized coal burning power generating stations. In particular, and as is set forth in U.S. Pat. No. 3,785,840 to Minnick et al, highly significant commercial processes and compositions have now been developed which can dispose of the fly ash produced in this equipment. Furthermore, and also in connection with these types of plants, a sludge is produced in the wet scrubbing of stack gases to remove sulfur oxide from the sulfur oxide-containing gases produced therein. The Minnick et al process permits one to simultaneously dispose of this waste material. Furthermore, these waste products have now been utilized in a manner so as to produce hardenable masses or cementitious compositions which can be utilized safely and efficiently for landfill purposes and the like.

The commercialization of these processes has primarily been carried out by Conversion Systems, Inc. and its subsidiary IU Technology Corporation. These processes were initially developed in view of the considerable interest which had arisen in protecting the environment by removing pollutants from various industrial sources, and particularly from the flue gases produced in combustion equipment, such as pulverized coal burning power generating stations.

The invention which is set forth in the above-noted U.S. Pat. No. 3,785,840 is thus of extreme commercial significance because it permits the disposal of not only the finely divided particulate material known as fly ash, but in addition, it permits the simultaneous disposal of the sludge which is produced in the wet scrubbing of sulfur oxide-containing stack gases by means of alkaline earth metal hydrates or carbonates. In this manner, not only is disposal of both of these waste products achieved, but it is achieved in the form of safe and useful landfill composition, which has been highly acceptable from an environmental point of view.

This prior invention has primarily been based upon the discovery that the specific combination of this sludge material, the fly ash, and sufficient alkaline earth metal oxide or hydroxide can result in a hardenable mass or cementitious composition. These materials can also be used for road base compositions, and other useful applications aside from pure landfull applications.

While these applications of the invention set forth in U.S. Pat. No. 3,785,840 have thus been of considerable significance from a commercial viewpoint, there has now developed an additional need for such products having improved physical characteristics, and most significantly improved permeability. That is, particularly where these compositions are to be used as landfill, the rainfall permeating such a landfill mass can significantly affect the ground water contamination levels thereof, and a low quantity of water permeating the landfill mass is therefore most desirable.

In addition, and particularly in those circumstances where these compositions are to be used in road bases or other load supporting structures the overall strength of these compositions also becomes a significant factor.

The hardenable cemetitious compositions produced by the method disclosed in the Minnick et al patent generally have a permeability coefficient of not less than about $2 \times 10^{-6}$ cm/sec, and in fact in the actual application of that invention to pulverized coal burning power generating stations and the like, typical guarantees for the product produced thereby usually include a guaranteed permeability coefficient of the cured material of, at best $5 \times 10^{-6}$ cm/sec. Furthermore, these compositions are generally guaranteed to have a compressive strength of no greater than about 25 psi.

With respect to various actual power company installations, among the lower permeability coefficients which have been measured, generally in connection with long term curing, is a coefficient of $3.13 \times 10^{-7}$ cm/sec in connection with the Lakeland Department of Electric and Water Utilities installation for a 28 month period.

In a report by the Electric Power Research Institute, dated September 1982, entitled "Landfill Disposal of Limestone Dual Alkali Flue Gas Desulfurization Waste", Arthur D. Little, Inc. analyzed the materials produced in a dual alkali system, namely one in which an alkali metal compound, namely a sodium compound, is used in the actual scrubbing process, while an alkaline earth material, namely calcium (lime), is employed outside of the alkali metal compound "loop", that is, so as to replace the alkali metal in the final product produced therein. The overall chemistry in this system is thus quite different from that in a conventional alkaline earth metal compound scrubbing system. In any event, this rather extensive study reached a number of conclusions, including the fact that, with higher lime contents longer times were required to develope maximum cured strength, and that for mixes with from 1 to 3% lime, a 28 day curing period was adequate, while this was not the case with higher lime contents. It was also determined that the compressive strength of the samples tested varied depending upon alterations in the lime, fly ash and solids content of the product. Thus, with solid contents of 56% and lime contents of 53%, by raising the ratio of the fly ash to the flue gas desulfurization filter cake up to about 1/1, the unconfined compressive strength was increased to about 25 kg/cm$^2$ for air dried samples. With respect to permeability coefficients, these tests demonstrated that the permeability coefficient for these compositions generally decreased with curing time, and that for lime contents of from about 3 to 5%, the permeability coefficient was found to decrease approximately 100 fold after curing. In particular, tests demonstrated permeability coefficients of $7.4 \times 10^{-7}$ cm/sec after 28 days of curing. The specific data underlying the conclusions in this report include individual samples which exhibited permeability coefficients of as low at $2.1 \times 10^{-8}$ cm/sec after 28 days of curing. However, not only did these tests relate exclusively to dual alkali systems, but the results obtained generally showed much higher permeability coefficients, and as indicated, the authors themselves indicated that ". . . coefficients of permeability for intact cured Plant Scholz stabilized FGD sludge of $10^{-5}$ to $10^{-6}$ cm/sec are considered representative". Indeed, the actual data upon which these estimations were apparently based did not even approach permeability coefficients which were this low.

In another report by the Electric Power Research Institute, in this case prepared by Michael Baker, Jr., Inc. and entitled "FGD By-Product Disposal Manual, Third Edition", dated January of 1983, it is generally stated that the use of this material as a liner for an evaporation pond at the Four Corner Station at the Arizona Public Service Company in 1974 resulted in the permeability of the mass being reported to be between $10^{-6}$ to $10^{-8}$ cm/sec after curing. The report also indicates that "possibly the liner could be made from the fixated waste materials if adequate quantities having permeabilities less than $10^{-7}$ cm/sec could be produced by properly modifying the treatment procedures". This report also indicates that these materials tested in unconfined compression exhibited strengths of several thousand pounds per square foot.

In a report entitled, "Geotechnical Evaluation of Stabilized FGD Sludge Disposal", by Ruggiano and Poulson, presented at the Second Conference on Air Quality Management in the Electric Power Industry on Jan. 24, 1980, further such materials were extensively tested. In particular, both the unconfined compressive strength and the permeability of actual samples contained in various sites, including that of the Columbus and Southern Ohio Electric Company's Conesville station site, were carried out. Increased unconfined compressive strength and decreased permeability were demonstrated with increased aging or curing of the samples involved. Specifically, unconfined compressive strengths for less than two months of aging were generally below 150 or 200 psi, although figures in excess of 250 psi were uncovered for long term samples. As for permeability, for samples aged less than two months, permeability coefficients of no less than about $5 \times 10^{-7}$ cm/sec were obtained. In particular, in one test the result of $2.9 \times 10^{-8}$ cm/sec were obtained for a long term sample, and unconfined compressive strengths of as high as 382 psi were uncovered for some such samples.

In the previous methods which have produced these compositions, the ratio of the amount of fly ash to the flue gas desulfurization (FGD) filter cake is generally solely a function of the particular plant in question, i.e. by the amount of such waste products which are actually produced therein. Thus, it has generally been known that in such commercial operations the ratio of fly ash to filter cake generally ranges from about 0.5/1 to about 3/1. It has also been recognized that these ratios can influence the ultimate permeability characteristics of the product produced thereby.

In connection with the mixing of these ingredients, it has generally been a significant concern in the past to limit the amount of such mixing, since overmixing has been known to result in the production of a thixotropic substance, which is difficult to handle, and which has therefore generally been scrupulously avoided. In the article "Mixing to Improve Handling Characteristics of Thixotropic Sludges", by D'Alonzo, presented at the 103rd Winter Annual Meeting ASME, November of 1982, it is specifically stated that undermixing does not provide adequate dispersion, but that overmixing deteriorates handleability of the product. It is further stated therein that "overmixing can trigger the thixotropic behavior of the original sludge so that the material becomes viscous and more difficult to handle".

It is therefore a primary object of the present invention to provide a method for producing such hardenable masses which have improved physical properties, including permeability coefficients and compressive strengths.

SUMMARY OF THE INVENTION

In accordance with the present invention it has now been discovered that this and other objects can now be achieved, and that a hardenable mass or cementitious composition can be produced from these various waste products, having improved permeability characteristics, and in particular having lower permeability coefficients than has heretofore been deemed possible. Such compositions can also be produced having improved compressive strengths. In particular, in accordance with this invention, hardenable masses have not been produced comprising an aqueous suspension of from about 55 to 90 weight percent solids, said solids comprising greater than about 3.5 weight percent alkaline earth metal oxide or hydroxide, said amount being based upon the equivalent amount of alkaline earth metal oxide, on a dry weight basis (and on an additive basis, that is based upon 100% of the other two components set forth below), from about 33 to about 75 weight percent pozzolanically active material, and from about 25 to about 67 weight percent alkaline earth metal sulfites (which may also include alkaline earth metal sulfates therein), with the overall hardenable mass being capable of providing a permeability coefficient of less than about $1 \times 10^{-7}$ cm/sec based upon curing for 28 days at 23° C.

More particularly, in accordance with a preferred embodiment of the compositions of the present invention, the hardenable mass has a solid content from about 70 to 80 weight percent solids. In a preferred embodiment, the alkaline earth metal oxides or hydroxides are present in those solids in a range of from about 3.5 to about 4.0 weight percent; the alkaline earth metal sulfite (again, possibly including sulfates) is present in an amount of from about 33 to about 50 weight percent, and the pozzolanically active material is present in an amount of from about 50 to about 67 weight percent, all based on the overall solids content thereof.

In a preferred embodiment of the compositions of the present invention, the composition has a permeability coefficient of less than about $5 \times 10^{-8}$ cm/sec, as well as unconfined compressive strength of greater than about 100 psi, based upon curing for 28 days at 23° C., and preferably a permeability coefficient of less than about $1 \times 10^{-8}$ cm/sec, and a compressive strength of greater than about 150 psi.

In accordance with another embodiment of the present invention, it has unexpectedly been discovered that such compositions can be produced by a process which includes providing a slurry produced from the scrubbing of sulfur oxide-containing gases with an alkaline earth metal compound, said slurry comprising an aqueous suspension of alkaline earth metal sulfites, mixing that slurry with a pozzolanically active waste material and an alkaline earth metal in the form of an alkaline earth metal hydroxide or a hydratable alkaline earth metal oxide in amounts so as to provide an overall composition including greater than about 3.5 weight percent alkaline earth metal oxide or hydroxide, said amount being based upon the equivalent amount of alkaline earth metal oxide, on a dry weight basis, and continuing the mixing of the overall composition for a period of time sufficient to provide a degree of mixing at least equivalent to about thirty seconds in an N-50 Hobart planetary mixer at first speed, whereby said overall composition is mixed to a degree at least approaching the thixotropic state for the overall composition.

In accordance with one embodiment of the process of the present invention, the ratio of the pozzolanically active waste materials to the slurry, calculated on a dry weight basis, is from between about 0.5/1 to about 3.0/1.

In a preferred embodiment of the process of the present invention, the overall composition includes between about 3.5 and 4% of alkaline earth metal oxide or hydroxide, said amount being based on the equivalent amount of alkaline earth metal oxide, on a dry weight basis. Again, this component is thus treated on an additive basis with respect to 100% of the components to which it is added.

In accordance with another embodiment of the process of the present invention, the process includes compacting the overall composition, and preferably such compacting is carried out so as to achieve a degree of compaction at least equivalent to about 40 impacts per layer, in accordance with ASTM standard D-558, and preferably at least equivalent to about 50 impacts per layer.

In accordance with another embodiment of the process of the present invention, the process includes dewatering the slurry so as to reduce the water content thereof below about 55%.

DETAILED DESCRIPTION

One of the critical characteristics which is achieved on the basis of this invention is the permeability coefficient for the hardenable materials produced hereby. In the past, many have referred to materials having permeability coefficients equal to or less than $1 \times 10^{-7}$ cm/sec as being "impermeable". In connection with this invention, however, permeability coefficients well below this figure can now be achieved, and it therefore become important that we understand the precise definition of these materials, and their properties. Since there is no standard ASTM test for this characteristic, in this application the permeability coefficients are referred to with reference to the "Falling Head Permeability Test, with a Permeameter Cylinder" as in Section 4, of Appendix VII of Specification Manual EM 1110-2-1906, entitled "ENGINEERING AND DESIGN LABORATORY SOILS TESTING", and issued by the U.S. Army Corps of Engineers. It is noted in this regard that in accordance with this test procedure, the sample in question must first be saturated, and then the rate at which the water passes through the sample can be used to determine the coefficient.

Another critical characteristic achieved by this invention is improved unconfined compressive strength. This characteristic is based upon the designation ASTM C593-76a, Section 8. In general, in the past for samples of this material cured for 28 days at 23° C., unconfined compressive strengths of less than about 100 psi and generally less than about 50 psi, have been found (See "Geotechnical Evolution of Stabilized FGD Sludge Disposal" presented at Second Conference on Air Quality Management in The Electric Power Industry, in Austin, Tex., Jan. 14, 1980).

One of the principal components of the hardenable mass composition of the present invention is a flue gas desulfurization scrubber sludge. Generally, the equipment used for the wet scrubbing of stack gases for sulfur oxide removal can take a number of forms, principally utilizing high calcium quicklime (CaO), hydrated lime, pulverized limestone, and may be enhanced by magnesium oxide or hydroxide. In each case, however, the liming agent is fed through the boiler gas scrubbing operation as a slurry in order to capture the sulfur oxide from the boiler gases and convert them mainly to calcium sulfite hydrate, but also to produce some sulfate therefrom. Hydrated lime refers to calcium hydroxide or a mixture of calcium hydroxide and either magnesium oxide or magnesium hydroxide. On the other hand, limestone refers to naturally occurring limestone, or dolomite generally consisting of calcium carbonate, or mixtures of calcium carbonate and magnesium carbonate.

The sludges produced by these operations may contain up to about 70 to 90 weight percent solids after treatment for dewatering, wherein prior to dewatering they typically have solids contents on the order of about 9%. These sludges can also include some calcium sulfate, generally caused by oxidation of the calcium sulfite therein, along with some fly ash, excess liming agent and the like.

Another essential component in the production of the hardenable mass composition of the present invention is the above-mentioned pozzolanically active waste materials. In connection with coal buring equipment, this primarily comprises fly ash, which is usually removed from stack gases by the use of mechanical collectors or electrostatic precipitators. The pozzolanic acitivity of fly ash is well known, as is the combination of fly ash with lime to produce cementitious compositions. The fly ash itself is a finely divided ash residue produced by the combustion of pulverized coal, which is carried off with the gases exhausted from the boilers or furnaces in which the coal is burned. As an alternative, however, materials having pozzolanic activity, the equivalent amount being determined by ASTM test method C-311, entitled "STANDARD METHODS FOR SAMPLING AND TESTING FLY ASH OR NATURAL POZZOLANS FOR USE AS A MINERAL ADMIXTURE IN PORTLAND CEMENT CONCRETE", with specific reference to the subheading thereunder entitled, "Pozzolanic Activity Index—With Lime", can be substituted for fly ash. Thus, fine ash resulting from the combustion of oil and from the combustion of waste materials in large incinerators can sometimes be used interchangeably with fly ash.

When fly ash is employed as the pozzolanically active component hereof, many such fly ash products which are produced in a commercial environment include therein a certain amount of lime. This is particularly true in connection with coal burning furnaces which employ coal from the western United States, where the content of lime therein is thus elevated in the fly ash product produced therein. Although this fly ash has thus been subjected to high temperatures during the use in furnaces and the like, much of it nonetheless retains its identity as lime, and cna thus contribute to the presence of the required alkaline earth metal component of the present invention when employed therein.

On an overall basis, the total amount of such alkaline earth metal oxide or lime which might be present in the fly ash itself, as well as in connection with any additional alkaline earth metal employed in the form of an alkaline earth metal hydroxide or a hydratable alkaline earth metal oxide, is added to the slurry component in accordance with this invention so as to provide the required amount of alkaline earth metal oxide or hydroxide in the combined composition which is to then be mixed in accordance herewith. As is indicated above, in the past even greater amounts of lime have on occasion been added to these compositions. For example, in the Minnick et al patent itself several of the examples include excess hydrated lime in amounts greater than that required by the present claims when calculated on the basis of 100% of the dry weight of both the filter cake and fly ash components therein. However, nowhere has the specific relationship between the amount of added alkaline earth metal oxide or hydroxide component in the overall composition and the ultimate permeability coefficient thereof been previously understood, and certainly not in connection with the presently claimed method for achieving such results. In addition, the synergistic combination of process steps which forms the basis for the present invention has never been appreciated, and in fact this is made apparent by the prior failure to produce such compositions on a commercial basis having the strikingly reduced permeability coefficients, as well as increased compressive strengths hereof.

The filter cake or slurry component of the present invention, as indicated above, is generally the product of conventional flue gas desulfurization processes. Thus, exhaust gases from pulverized coal burning power stations, after being fed through venturi gas scrubbing systems of that type, are subjected to such a process. These systems generally employ a scrubbing fluid of approximately 10 to 20 weight percent of finely pulverized limestone ($CaCO_3$) in water. The sulfur oxide gases produced during combustion of the pulverized coal are then chemically captured by the limestone slurry. Furthermore, a portion of the fly ash being carried by the exhaust gases may be physically captured in the liquid flow, and the scrubber output slurry generally has a composition of about 85 to 95 weight percent water, about 3 to 12 weight percent $CaSO_3 \cdot \frac{1}{2}H_2O + CaSO_4 \cdot 2H_2O$, about 1 to 2 weight percent unreacted limestone, and 0 to about 2 weight percent fly ash. This slurry composition is then fed to a thickener to increase the solids content up to approximately 45 to 65%. The output from the thickener is then fed to a vacuum drum filter, where the solids content is further increased to approximately 45 to 90 weight percent solids. The filter cake thus produced in the vacuum filter then drops on to a conveyor. At this stage, a hopper and vibratory feeder discharge the alkaline earth metal oxide or hydroxide component, such as lime, onto the conveyor, along with additional fly ash as desired, for mixing purposes. The overall mixture is then blended in accordance with this invention in order to achieve a highly uniform composition which begins to approach its thixotropic state. It is noted in this regard that in the case of a highly oxidized scrubber sludge, it can become quite difficult to produce such a thixotropic material. It is therefore intended by this terminology to mean that, in such a case, while one increases the degree of mixing so as to begin to approach such a state, it is not necessarily the case that the material is even on the verge of becoming thixotropic with only slightly more mixing.

Returning to this highly significant mixing step of the present invntion, as has been indicated above the mixing of these components in the past has been severely restricted, particularly in view of the fear of approaching the thixotropic state therefor. The degree of mixing of these components can be quantified with reference to ASTM C305-82, entitled "STANDARD METHOD FOR MECHANICAL MIXING OF HYDRAULIC CEMENT PASTES AND MORTARS OF PLASTIC CONSISTENCY". Thus, referring to this standardization, and to the use of a Hobart N-50 mixer, at first speed, it has been determined that conventional mixing prior to the present invention, such as that which occurs in the plant, on a commercial basis, is equivalent to about 8 seconds of such mixing in a Hobart N-50 mixer, at first speed. In actual practice, for example, blending in a pug mill for $\frac{1}{3}$ to about $\frac{2}{3}$ minutes has been common. In accordance with the present invention, however, and again referring to the standard based upon a Hobart N-50 mixer, at first speed, such mixing is now carried out for a period of at least about thirty seconds, and preferably for at least about one minute. The effects of such mixing, in terms of both the permeability coefficient of the ultimate product and its compressive strength, is shown in more detail below. In any event, it has also been discovered that not only should the approach of the thixotropic state for this composition not be feared, but that even if the thixotropic state is reached, and the mass does become plastic in nature, after a period of from about 1 to 10 days, and generally from about 2 to 4 days, the material can still be utilized to achieve the same desirable results which result in accordance with the overall process of this invention, namely decreased permeability coefficient and increased compressive strengths.

After the overall mixing step of this invention has been concluded, the material can then be utilized for landfill purposes or the like, or for structural purposes, such as road beds, etc. In general, the present commercial practice in the case of landfill usage includes initially merely hauling this material to the dump site. After dumping, the material is spread in relatively uniform layers, and is then compressed or compacted by means of several passes with standard rollers, or vibratory rollers. The general practice has been to attempt to approach the maximum density for this material, which is not very soluble. Thus, the overall moisture content can be quite significant in this regard, in any event, the degree of compaction itself is measured with reference to ASTM D698-78, entitled "STANDARD TEST METHODS FOR MOISTURE-DENSITY RELATIONS OF SOILS AND SOIL-AGGREGATE MIXTURES USING 5.5 LB. (2.49 kg) RAMMER AND 12 INCH (305 mm) DROP". Thus, with reference to this standardized test, it has been determined that conventional compacting prior to the present invention, such as that which occurs in the field on a commercial basis, is at best equivalent to about 25 impacts per layer in accordance with ASTM standard D-558. In accordance with the present invention, however, and again referring to these same standards, it has been found that an additional synergistic component in providing the highly improved permeability coefficients and compressive strengths of this invention is provided when compaction of this material is carried out to a significantly greater extent than has previously been the case, i.e. so as to achieve a degree of compaction at least equivalent to about 40 impacts per layer, and preferably 50 impacts per layer in accordance with ASTM standard D-558. It has also been found that increasing the equivalent number of compacts for above 50 such impacts, however, provides little if any additional advantage in this regard.

It is also possible to incorporate into these compositions hereof supplementary or complementary material, such as those disclosed in co-pending U.S. application Ser. No. 592,677, filed on July 2, 1975. These materials can thus include Portland cement, high alumina cement, waste lime, lime kiln dust, partially calcined lime, cement kiln dust, BOF and blast furnace waste dust, or slag, coal mine refuse or tailings, "red mud" resulting from the chemical reduction of bauxite, alum waste, bottom ash and any highly amorphous siliceous or alumino-siliceous incineration residue, such as that from petroleum refinery waste incineration. These materials can provide some of the reactants for the pozzolonic cementitous reaction, or they may merely act as aggregate or fillers herefore. They might also provide supplementary cementitous activity, as in the use of Portland or alumina cement. Such materials as waste lime, partially calcined lime, cement kiln dust and blast furnace or BOF waste dust are active sources of alkaline earth metal hydroxides.

The overall nature of the present invention, and the synergistic effect of the individual process steps hereof in producing the novel compositions of this invention, are more clearly demonstrated in the following examples.

EXAMPLE 1

In a first series of experiments, a fly ash composition from Indianapolis Power and Light Co., Petersburg No. 3 Power Station was employed, which is basically a bituminous fly ash composition having the following size distribution:

| passing #10 mesh | 100% |
|---|---|
| #40 mesh | 99.78% |
| #60 mesh | 99.23% |
| 74 microns | 90.84% |
| 31 microns | 64.52% |
| 20 microns | 54.85% |
| 12 microns | 38.72% |
| 9 microns | 32.26% |
| 7 microns | 22.58% |
| 3 microns | 12.90% |
| 1 micron | 9.70% |

This fly ash composition was used along with a filter cake produced from a limestone flue gas desulfurization scrubbing process, which was magnesium enhanced, and which filter cake (slurry) had the following size characteristics:

| passing #10 mesh | 100% | (on a dry weight basis) |
|---|---|---|
| #40 mesh | 99.95% | |
| #60 mesh | 99.92% | |
| 74 microns | 99.76% | |
| 29 microns | 90.92% | |
| 18 microns | 87.62% | |
| 11 microns | 74.37% | |
| 8 microns | 59.51% | |
| 6 microns | 44.64% | |
| 3 microns | 13.22% | |
| 1 micron | 8.27% | |

This composition was then mixed at a fly ash to filter cake ratio, on a dry weight basis, of 1.3/1. To this was added 3.5 weight percent of additional quicklime. The overall composition was mixed for 60 seconds in a Hobart planetary mixer, at first speed. After production, the composition was compacted in three layers with 50 impacts per layer in accordance with ASTM standard D-558, "Standard Test Methods For Moisture-Density Relations Of Soil-Cement Mixtures". The compactor employed was set for a 5.5 pound weight falling 12 inches.

The specimens produced were cured in a Proctor mold wrapped in two layers of plastic to maintain moisture (necessary for curing), at 23° C., for 28 days. Subsequent to curing, five specimens were placed in permameters and placed to saturate under varying water column heights (or mercury equivalents). The results obtained were as set forth in Table I below.

TABLE I

| Water Column Height (feet) | Saturation Time Required (hours) | Permeability Coefficient (cm/sec) |
|---|---|---|
| 115.4 | 12 | $3.6 \times 10^{-8}$ |
| 46 | 24 | $2.6 \times 10^{-8}$ |
| 17.23 | 108 | $3.7 \times 10^{-8}$ |
| 6 | 2.5+ years | |
| 3 | 2.5+ years | |
| 1 (12") | Computer Projection: 21 years | |
| 0.1 (1.2") | Computer Projection: 3,387 years | |
| 0.042 (0.5") | Computer Projection: 23,160 years | |

EXAMPLE 2

In a series of tests, processes comparable to that set forth in Example 1 were carried out, with variations in each of the parameters. In particular, additional lime contents of 0, 2 and 4% (added on a dry weight basis, and based on an equivalent amount of the alkaline earth metal oxide) were employed. In addition the ratio of fly ash to filter cake was varied between about 0.5/1 and about 3.5/1, on a dry weight basis. As for the mixing step with respect to the filter cake and the fly ash and alkaline earth metal oxide or hydroxide components, conventional mixing was considered to be equivalent to 8 seconds of mixing in a Hobart mixer, at first speed. For test purposes mixing was conducted at periods of 8 seconds and 30 seconds at first speed in a Model N-50 Hobart mixer.

As for compaction, again ASTM standard D-558 "Standard Test Methods For Moisture-Density Relations Of Soil-Cement Mixtures" was utilized with a Proctor specimen composed of three layers with 25 impacts or blows per layer. Modified compactive effort of 5.5 pounds weight falling 12" was employed. In addition, 50 impacts or blows per layer were employed for increased compaction.

As for curing, this was accomplished on an accelerated basis by wrapping the specimens in plastic to maintain moisture at 100° F. for 7 days, which has been found to be approximately equivalent to 28 days of curing at 73° F. (23° C.).

The results obtained in testing 70 different such compositions are set forth in Table II below.

TABLE II

| Composition | FA:FC Ratio (DWB) | Lime Added (%) | Mixing Period (SEC) | Nos. Blows/Layer | Dry Density (LB/FT$^3$) | Comp. Str. (PSI) | Permeability Coefficient (CM/SEC) |
|---|---|---|---|---|---|---|---|
| 1 | .5 | 2 | 8 | 25 | 94.2 | 49 | $2.65 \times 10^{-6}$ |
| 2 | 1 | 2 | 8 | 25 | 95.9 | 93 | $6.78 \times 10^{-7}$ |
| 3 | 1.5 | 2 | 8 | 25 | 97.4 | 111 | $1.84 \times 10^{-6}$ |
| 4 | 2 | 2 | 8 | 25 | 98.4 | 167 | $9.69 \times 10^{-7}$ |
| 5 | 2.5 | 2 | 8 | 25 | 100 | 298 | $3.45 \times 10^{-6}$ |
| 6 | 3 | 2 | 8 | 25 | 101.3 | 205 | $9.11 \times 10^{-7}$ |
| 7 | 3.5 | 2 | 8 | 25 | 100 | 185 | $2.28 \times 10^{-5}$ |
| 8 | .5 | 4 | 30 | 50 | 96.5 | 86 | $1.92 \times 10^{-7}$ |
| 9 | 1 | 4 | 30 | 50 | 99 | 240 | $2.84 \times 10^{-9}$ |
| 10 | 1.5 | 4 | 30 | 50 | 98 | 285 | $7.88 \times 10^{-9}$ |
| 11 | 2 | 4 | 30 | 50 | 99.7 | 326 | $5.88 \times 10^{-8}$ |
| 12 | 2.5 | 4 | 30 | 50 | 100.4 | 439 | $2.88 \times 10^{-8}$ |
| 13 | 3 | 4 | 30 | 50 | 100.6 | 489 | $4.93 \times 10^{-8}$ |
| 14 | 3.5 | 4 | 30 | 50 | 100.2 | 625 | $1.29 \times 10^{-7}$ |
| 15 | .5 | 2 | 8 | 50 | 97.4 | 72 | $1.21 \times 10^{-6}$ |
| 16 | 1 | 2 | 8 | 50 | 99.3 | 136 | $4.43 \times 10^{-7}$ |
| 17 | 1.5 | 2 | 8 | 50 | 100.2 | 209 | $4.01 \times 10^{-7}$ |
| 18 | 2 | 2 | 8 | 50 | 100.1 | 189 | $4.9 \times 10^{-7}$ |
| 19 | 2.5 | 2 | 8 | 50 | 101.4 | 241 | $1.78 \times 10^{-7}$ |
| 20 | 3 | 2 | 8 | 50 | 100.7 | 299 | $6.49 \times 10^{-7}$ |
| 21 | 3.5 | 2 | 8 | 50 | 99.2 | 209 | $1.81 \times 10^{-6}$ |
| 22 | .5 | 2 | 30 | 25 | 93.8 | 48 | $1.38 \times 10^{-6}$ |
| 23 | 1 | 2 | 30 | 25 | 97.6 | 122 | $1.48 \times 10^{-7}$ |
| 24 | 1.5 | 2 | 30 | 25 | 100.2 | 182 | $2.15 \times 10^{-7}$ |
| 25 | 2 | 2 | 30 | 25 | 101.9 | 354 | $1.83 \times 10^{-7}$ |
| 26 | 2.5 | 2 | 30 | 25 | 101.7 | 302 | $2.27 \times 10^{-7}$ |
| 27 | 3 | 2 | 30 | 25 | 101.2 | 388 | $5.71 \times 10^{-7}$ |
| 28 | 3.5 | 2 | 30 | 25 | 101.2 | 296 | $8.6 \times 10^{-7}$ |
| 29 | .5 | 2 | 30 | 50 | 96.8 | 119 | $5.5 \times 10^{-7}$ |
| 30 | 1 | 2 | 30 | 50 | 100 | 277 | $1.41 \times 10^{-8}$ |
| 31 | 1.5 | 2 | 30 | 50 | 101.4 | 259 | $7.56 \times 10^{-7}$ |
| 32 | 2 | 2 | 30 | 50 | 101.4 | 411 | $1.34 \times 10^{-6}$ |
| 33 | 2.5 | 2 | 30 | 50 | 101.4 | 417 | $1.27 \times 10^{-6}$ |
| 34 | 3 | 2 | 30 | 50 | 101 | 421 | $6.39 \times 10^{-7}$ |
| 35 | 3.5 | 2 | 30 | 50 | 98.7 | 255 | $1.12 \times 10^{-6}$ |
| 36 | .5 | 4 | 8 | 25 | 94.6 | 84 | $1.12 \times 10^{-6}$ |
| 37 | 1 | 4 | 8 | 25 | 94.2 | 141 | $1.02 \times 10^{-6}$ |
| 38 | 1.5 | 4 | 8 | 25 | 96.1 | 167 | $8.28 \times 10^{-7}$ |
| 39 | 2 | 4 | 8 | 25 | 97.3 | 200 | $4.87 \times 10^{-7}$ |
| 40 | 2.5 | 4 | 8 | 25 | 97.4 | 191 | $8.2 \times 10^{-7}$ |
| 41 | 3 | 4 | 8 | 25 | 98.6 | 230 | $4.08 \times 10^{-7}$ |
| 42 | 3.5 | 4 | 8 | 25 | 97.5 | 182 | $1.25 \times 10^{-6}$ |
| 43 | .5 | 4 | 8 | 50 | 94.8 | 51 | $6.41 \times 10^{-6}$ |
| 44 | 1 | 4 | 8 | 50 | 97.6 | 123 | $5.04 \times 10^{-6}$ |
| 45 | 1.5 | 4 | 8 | 50 | 100.8 | 208 | $8.23 \times 10^{-8}$ |
| 46 | 2 | 4 | 8 | 50 | 98.8 | 107 | $7.11 \times 10^{-8}$ |
| 47 | 2.5 | 4 | 8 | 50 | 100.6 | 286 | $3 \times 10^{-7}$ |
| 48 | 3 | 4 | 8 | 50 | 101.5 | 357 | $1.45 \times 10^{-7}$ |
| 49 | 3.5 | 4 | 8 | 50 | 97.8 | 156 | $6.72 \times 10^{-6}$ |
| 50 | .5 | 4 | 30 | 25 | 94.8 | 73 | $6.54 \times 10^{-7}$ |
| 51 | 1 | 4 | 30 | 25 | 94.3 | 216 | $1.46 \times 10^{-6}$ |
| 52 | 1.5 | 4 | 30 | 25 | 94.5 | 305 | $1.39 \times 10^{-6}$ |
| 53 | 2 | 4 | 30 | 25 | 94 | 354 | $3.18 \times 10^{-6}$ |
| 54 | 2.5 | 4 | 30 | 25 | 95.5 | 383 | $2.12 \times 10^{-6}$ |
| 55 | 3 | 4 | 30 | 25 | 94.3 | 309 | $2.42 \times 10^{-7}$ |
| 56 | 3.5 | 4 | 30 | 25 | 96.9 | 398 | $1.72 \times 10^{-6}$ |
| 57 | .5 | 0 | 8 | 25 | 95.3 | 0 | $1.2 \times 10^{-5}$ |
| 58 | 1 | 0 | 8 | 25 | 95.3 | 0 | $6.9 \times 10^{-5}$ |
| 59 | 1.5 | 0 | 8 | 25 | 99.3 | 0 | $3 \times 10^{-5}$ |
| 60 | 2 | 0 | 8 | 25 | 101.3 | 0 | $7.2 \times 10^{-6}$ |
| 61 | 2.5 | 0 | 8 | 25 | 102.1 | 0 | $8.4 \times 10^{-6}$ |
| 62 | 3 | 0 | 8 | 25 | 101.3 | 0 | $9.7 \times 10^{-6}$ |
| 63 | 3.5 | 0 | 8 | 25 | 99.5 | 0 | $2.7 \times 10^{-5}$ |
| 64 | .5 | 0 | 30 | 50 | 93.5 | 0 | $1.1 \times 10^{-5}$ |
| 65 | 1 | 0 | 30 | 50 | 100.9 | 0 | $6.8 \times 10^{-6}$ |
| 66 | 1.5 | 0 | 30 | 50 | 101.5 | 0 | $6.3 \times 10^{-6}$ |
| 67 | 2 | 0 | 30 | 50 | 102.5 | 0 | $6.3 \times 10^{-6}$ |
| 68 | 2.5 | 0 | 30 | 50 | 103 | 0 | $5.3 \times 10^{-6}$ |
| 69 | 3 | 0 | 30 | 50 | 101.6 | 0 | $5.3 \times 10^{-6}$ |
| 70 | 3.5 | 0 | 30 | 50 | 100.1 | 0 | $6.5 \times 10^{-6}$ |

One of the results which is clearly contained in these experiments is a demonstration of the direct relationship between the fly ash to filter cake ratio and the unconfined compressive strength achieved. Increased fly ash component thus clearly increases compressive strength. On the other hand, there does not appear to be a direct linear relationship between the fly ash to filter cake ratio and the permeability coefficients achieved. In fact, the lowest permeabilities were uncovered at middle ranges for the fly ash to filter cake ratios for most of these compositions. There is thus an indication that selection of these particular fly ash to filter cake ratios, preferably within the range of from about 1/1 to about 2/1, are most desirable from a permeability point of view.

These results further indicate that lime addition, or the inclusion of the required alkaline earth metal oxide or hydroxide component, is critical to the strength of the products achieved. However, it is also apparent that the increase in lime content then requires additional curing time in order to produce the required strength. Furthermore, as indicated, a direct relationship between increased lime content and decreased permeability coefficients was discovered in connection with this data.

Turning to the mixing of the components, the results indicate that the compressive strength for the samples was nearly doubled by improving the mixing in the manner set forth therein, and furthermore that the permeability coefficient decreased by about one-half order of magnitude therewith.

Turning to compaction, small changes in average strength and permeability were found with increased compactive effort.

All of these factors can be further reviewed by analysis of Table III below, in which arithmetic averages for the 70 specific tests set forth in Table II above were prepared.

TABLE III

|  | Compressive Strength (psi) | Permeability Coefficient (cm/sec) |
|---|---|---|
| Fly Ash:Filter Cake | | |
| 0.5:1 | 73 | $2.91 \times 10^{-6}$ |
| 1.0:1 | 169 | $1.10 \times 10^{-6}$ |
| 1.5:1 | 216 | $6.90 \times 10^{-7}$ |
| 2.0:1 | 289 | $8.47 \times 10^{-7}$ |
| 2.5:1 | 320 | $1.01 \times 10^{-6}$ |
| 3.0:1 | 326 | $4.52 \times 10^{-7}$ |
| 3.5:1 | 288 | $4.55 \times 10^{-6}$ |
| Lime Level | | |
| 0%* | 0 | $1.43 \times 10^{-5}$ |
| 2% | 255 | $1.70 \times 10^{-6}$ |
| 4% | 251 | $1.22 \times 10^{-6}$ |
| Mixing intensity | | |
| 8 seconds | 177 | $2.26 \times 10^{-6}$ |
| 30 seconds | 303 | $7.32 \times 10^{-7}$ |
| Compaction Effort | | |
| 25 B/L | 215 | $1.91 \times 10^{-6}$ |
| 50 B/L | 260 | $1.07 \times 10^{-6}$ |

*0% lime composition data not used elsewhere in this table

It is believed that these results, as shown most vividly in Table III hereinabove, demonstrate the synergistic effect of combining these factors, as opposed to the effect of each of them alone, on the compressive strength and permeability coefficients thus produced. While a major change in permeability due to each one of these parameters is not clearly recognizable, there are major changes achieved in their combination. In accordance with the claimed process hereof, this can be more fully appreciated by a comparison of Tables IV and V below, in which Table IV basically shows these parameters for the POZ-O-TEC compositions (POZ-O-TEC is a registered trademark of Conversion Systems, Inc.) previously produced, and Table V shows these parameters for the composition produced in accordance with this invention:

TABLE IV

|  | Saturation Requirements | | Permeability Coefficient | |
|---|---|---|---|---|
|  | No Lime (Hrs) | 2% Lime (Hrs) | No Lime (cm-sec) | 2% Lime (cm/sec) |
| 0.5:1 | 1 | 24 | $1.18 \times 10^{-5}$ | $2.65 \times 10^{-6}$ |
| 1.0:1 | 1 | 24 | $6.86 \times 10^{-5}$ | $6.78 \times 10^{-7}$ |
| 1.5:1 | 1 | 24 | $3.02 \times 10^{-5}$ | $1.84 \times 10^{-6}$ |
| 2.0:1 | 1 | 28 | $7.17 \times 10^{-6}$ | $9.69 \times 10^{-7}$ |
| 2.5:1 | 1 | 24 | $8.43 \times 10^{-6}$ | $3.45 \times 10^{-6}$ |
| 3.0:1 | 1 | 24 | $9.63 \times 10^{-6}$ | $9.11 \times 10^{-7}$ |
| 3.5:1 | 1 | 24 | $2.67 \times 10^{-5}$ | $2.28 \times 10^{-5}$ |

TABLE V

|  | Saturation Requirements | | Permeability Coefficient | |
|---|---|---|---|---|
|  | No Lime (Hrs) | 4% Lime (Hrs) | No Lime (cm/sec) | 4% Lime (cm/sec) |
| 0.5:1 | 1 | 18 | $1.07 \times 10^{-5}$ | $1.92 \times 10^{-7}$ |
| 1.0:1 | 1-2 | 1300 | $6.78 \times 10^{-6}$ | $2.84 \times 10^{-9}$ |
| 1.5:1 | 1-2 | 104 | $6.31 \times 10^{-6}$ | $7.88 \times 10^{-9}$ |
| 2.0:1 | 1-2 | ~96 | $6.33 \times 10^{-6}$ | $5.88 \times 10^{-8}$ |
| 2.5:1 | 1-2 | ~96 | $5.30 \times 10^{-6}$ | $2.88 \times 10^{-8}$ |
| 3.0:1 | 1-2 | ~96 | $5.34 \times 10^{-6}$ | $4.93 \times 10^{-8}$ |
| 3.5:1 | 1 | ~96 | $6.53 \times 10^{-6}$ | $1.29 \times 10^{-7}$ |

These results demonstrate an effect for the various combinations of components to a degree of two or three orders of magnitude.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What I claim is:

1. A process for the production of a hardenable mass having low permeability characteristics which comprises providing a slurry produced from the scrubbing of sulfur oxide-containing gases with an alkaline earth metal compound, said slurry comprising an aqueous suspension of alkaline earth metal sulfites, mixing said slurry with a pozzolanically active waste material and an alkaline earth metal in the form of an alkaline earth metal hydroxide or a hydratable alkaline earth metal oxide in amounts so as to provide an overall composition including greater than about 3.5 weight percent alkaline earth metal oxide or hydroxide, said amount being based on the equivalent amount of alkaline earth metal oxide, on a dry weight and additive basis, and wherein the ratio of said pozzolanically active waste material to said slurry, calculated on a dry weight basis, is from about 0.5 to 1 to about 3.0 to 1, and continuing the mixing of said overall composition for a period of time sufficient to provide a degree of mixing at least equivalent to about thirty seconds in a Hobart planetary mixer at first speed, whereby said overall composition is mixed to a degree at least approaching the thixotropic state for said overall composition.

2. The process of claim 1, wherein said overall composition includes between about 3.5 and 4.0 weight percent of said alkaline earth metal oxide or hydroxide, said amount being based on the equivalent amount of alkaline earth metal oxide, on a dry weight and additive basis.

3. The process of claim 1, including compacting said overall composition.

4. The process of claim 3, wherein said step of compacting said overall composition is carried out so as to achieve a degree of compaction at least equivalent to about 40 impacts per layer, in accordance with ASTM standard D-558.

5. The process of claim 1, including dewatering said slurry so as to reduce the water content thereof below about 55%.

6. The process of claim 1, wherein said mixing is continued for a period of time sufficient to provide a degree of mixing at least equivalent to about one minute in a Hobart planetary mixer, at first speed.

7. The process of claim 1, wherein said pozzolanically active waste material comprises fly ash.

8. The process of claim 1, wherein said ratio of said pozzolanically active waste material to said slurry is adjusted so as to decrease the permeability characteristics of said hardenable mass.

9. The process of claim 1, wherein said alkaline earth metal comprises calcium.

10. A hardenable mass comprising an aqueous suspension of from about 55 to 90 weight percent solids, said solids consisting essentially of greater than about 3.5 weight percent alkaline earth metal oxide or hydroxide, said amount being based on the equivalent amount of alkaline earth metal oxide, on a dry weight and additive basis, from about 33 to 75 weight percent pozzolanically active material, and from about 25 to 67 weight percent alkaline earth metal sulfite and alkaline earth metal sulfate, said hardenable mass being capable of providing a permeability coefficient of less than about $1 \times 10^{-7}$ cm/sec based upon curing for 28 days at 23° C.

11. The composition of claim 10, having a solids content of between about 70 to 80 weight percent.

12. The composition of claim 10, wherein said alkaline earth metal oxide or hydroxide is present in an amount of from between about 3.5 to 4.0 weight percent.

13. The composition of claim 10, wherein said alkaline earth metal sulfite and alkaline earth metal sulfate is present in an amount of between about 33 and 50 weight percent.

14. The composition of claim 10, wherein said pozzolancially active material is present in an amount of between about 50 and 67 weight percent.

15. The composition of claim 10, being capable of providing a permeability coefficient of less than about $5 \times 10^{-8}$ cm/sec based upon curing for 28 days at 23° C.

16. The composition of claim 15, being capable of providing a permeability coefficient of less than about $1 \times 10^{-8}$ cm/sec based upon curing for 28 days at 23° C.

17. The composition of claim 12, wherein said alkaline earth metal oxide or hydroxide comprises calcium oxide or hydroxide.

18. The composition of claim 13, wherein said alkaline earth metal sulfite comprises calcium sulfite.

19. The composition of claim 14, wherein said pozzolancially active material comprises fly ash.

20. The composition of claim 10, being capable of providing an unconfined compressive strength of greater than about 100 psi.

21. The composition of claim 10, being capable of providing an unconfined compressive strength of greater than about 150 psi.

* * * * *

UNITED STATES PATENT AND TRADEMARK OFFICE
CERTIFICATE OF CORRECTION

PATENT NO.  : 4,613,374

DATED       : September 23, 1986

INVENTOR(S) : Charles L. Smith

It is certified that error appears in the above-identified patent and that said Letters Patent is hereby corrected as shown below:

Column 6, line 3, "14" should read --24--.
Column 6, line 37, "acitivity" should read --activity--.
Column 6, line 66, "cna" should read --can--.

Signed and Sealed this

Twenty-seventh Day of January, 1987

Attest:

DONALD J. QUIGG

Attesting Officer     Commissioner of Patents and Trademarks